Oct. 21, 1952
M. STAUNT
2,614,556
GUM MASSAGER
Filed Nov. 29, 1951
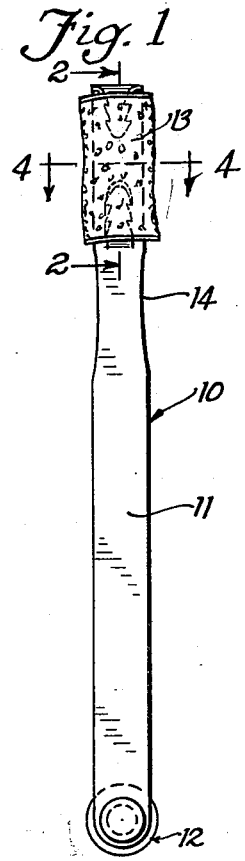
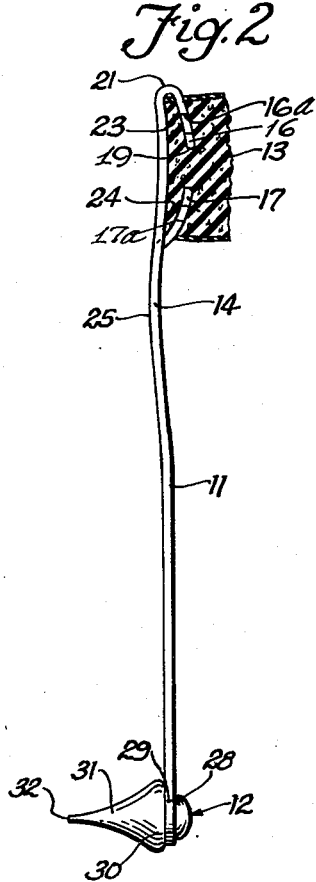
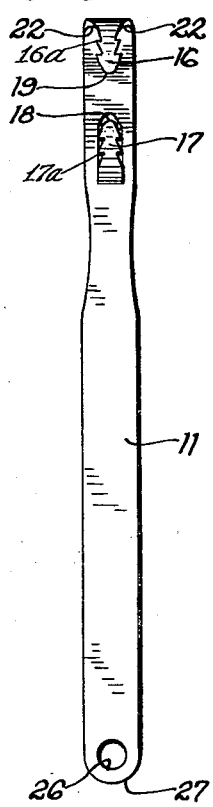
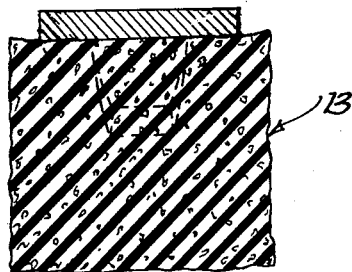
INVENTOR.
Martin Staunt
BY Robt H. Wendt
Att'y Patented Oct. 21, 1952

2,614,556

UNITED STATES PATENT OFFICE 2,614,556

GUM MASSAGER

Martin Staunt, Des Plaines, Ill.

Application November 29, 1951, Serial No. 258,812

1 Claim. (Cl. 128—62)

The present invention relates to gum massagers, and is particularly concerned with an improved form of gum massager, the soft parts of which may be replaced, renewed, or sterilized, being readily removable from the handle.

The present application is a continuation-in-part of my prior application, Ser. No. 195,010, filed November 10, 1950, now Patent Number 2,600,136, for Gum Massager; and this application relates particularly to the interdental point used on the massager.

One of the objects of the invention is the provision of an improved gum massaging device which is adapted to absorb and spread medicaments of a liquid type at the same time the gums are being massaged.

Another object is the provision of an improved gum massager having a permanent handle and a removable and renewable block of sponge rubber which is firmly yet removably mounted on the handle.

Another object of the invention is the provision of an improved gum massager, the handle of which may also be provided with a rubber pointed member for use in massaging the gums at points between the teeth, that is, for interproximal spaces.

Another object of the invention is the provision of an improved handle construction which is adapted to interlock with a block of sponge rubber and an improved form of rubber point which can easily be assembled with the metal handle, and which will not become detached when pressure is applied to either of these members.

Other objects and advantages of the invention will be apparent from the following description and the accompanying drawings, in which similar characters of reference indicate similar parts throughout the several views.

Referring to the single sheet of drawings,

Fig. 1 is a front elevational view of a gum massager embodying the invention;

Fig. 2 is a side elevational view, with the sponge rubber block in section to show its mode of attachment;

Fig. 3 is a front elevational view of the metal handle alone; and

Fig. 4 is an enlarged sectional view, taken on the plane of the line 4—4 of Fig. 1, looking in the direction of the arrows.

Referring to Figs. 1 and 2, the present gum massager 10 preferably includes a handle 11, a rubber pointed member 12, and a sponge rubber block 13. The handle 11 may be of any suitable rigid material, such as fiber or plastic, provided it is inert to chemical action. It is preferably made of metal, such as stainless steel, so that it can be kept in a clean and shining condition and sterilized without damage.

The handle 11 may consist of a strip of stainless steel of substantially uniform width, except that it is preferably narrowed or curved inwardly at 14 near the sponge rubber. The handle 11 is shown alone in Fig. 3. At its upper end it is provided with an elongated rectangular aperture 15 located below a pair of tapered prongs 16 and 17.

The tapered prongs 16 and 17 have rounded points 18, 19; and prong 17 may be formed out of the body of the handle, utilizing the material which is bent up out of the aperture 15. The aperture 15, however, is wider and longer than the prongs and is adapted to receive a portion 20 of the sponge rubber block 13, which is pressed into the aperture 15 and held there by prongs 16 and 17.

At its upper end the handle 11 (Fig. 2) is provided with an easy hairpin bend 21 at the base of the prong 16, which tapers gradually on both of its sides 22 to a relatively blunt point. Both prongs 16 and 17 form, with the remainder of the body of the handle 11, a wedging groove, as indicated at 23 and 24 in Fig. 2, between which parts of the sponge rubber block are wedged.

The prongs 16, 17 have teeth 16a, 17a, to retain the sponge rubber.

The handle 11 is preferably bent backward with a rather large curve at the narrow neck 14, this outer rear curved surface being indicated at 25 (Fig. 2).

The sponge rubber block 13 consists of a block of porous compressible live resilient rubber, which is preferably wider than the body of the handle and longer than the space between the bases of the prongs 16 and 17; that is, the sponge rubber block 13 has to be compressed not only to get it between the ends of the prongs, but it is still under endwise compression when it is seated on the prongs 16 and 17, as shown in Fig. 2.

The sponge rubber block is preferably punched with small apertures extending in from each end for reception of the prongs 16 and 17; and the apertures are centrally located so that when the prongs are seated in them the back of the rubber block has a portion 20 pressed into the aperture 15.

All of these features of construction combine to interlock the sponge rubber block firmly with the parts of the handle so that it will not become detached when subjected to pressure and reciprocating motion along its axis or transverse to its axis.

At its lower end (Fig. 3) handle 11 is provided with a round aperture 26, the edge of which is concentric with the rounded end 27 of the handle. This aperture is adapted to receive the pointed rubber member 12, which has a head 28, a groove 29, and a laterally projecting enlargement 30 on the other side of the groove. From the enlargement 30 the pointed rubber member 12 tapers concavely at 31 to a sharp resilient point at 32.

Enlargement 30 is round and is made on a radius larger than the curved end of handle 11; thus the rubber projects beyond the stainless steel and protects the gums against contact with the metal.

The head 28 is small enough so that it may be compressed and pushed through the aperture 26 so that the rim of metal surrounding aperture 26 may be firmly seated in the groove 29. Thus the handle is gripped between the enlargements 30 and 28; and the groove 29 may be made actually smaller than the thickness of the handle so that the rubber pointed member 12 will actually grip the handle.

The pointed member 12 may be used for the interproximal spaces, while the sponge rubber block 13 may be used for massaging the gums on the inside and the outside. The sponge rubber is so soft that there is no likelihood of damaging the gums; and all of the metal parts are entirely covered with sponge rubber where they might come in contact with the gums.

The soft rubber point and sponge rubber block may be renewed or replaced; and the entire assembly may be subjected to sterilizing heat without damage.

It will thus be observed that I have invented an improved gum massager which is simple in construction, and which may be used on all parts of the gums. The rubber parts of the massager may wear out, but new parts may be substituted; and the absorbent nature of the sponge rubber block makes it possible to spread liquid medicaments on the gum with the massager.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

A gum massager comprising an elongated handle of sheet metal or the like having plane sides, and having a rounded end provided with an aperture substantially concentric with the end, said aperture being substantially cylindrical, and an interdental massaging member comprising an integral unit made of soft resilient rubber provided with a circular body having an annular surface for engaging one side of the handle, an integral cylindrical shank engaging in said aperture, and a rounded head adapted to be pushed through the aperture and to expand to engage the opposite side of the handle at said aperture, the said body having an acutely pointed elongated working end which is formed by a concave curved surface of revolution so that the pointed end is sharp and small over a substantial portion of its length, due to said concavity, which permits its insertion into and through the interdental spaces, the said circular body having a larger radius of the said rounded end, with reference to the said cylindrical aperture so that said body projects beyond the rounded metal end to prevent the metal from engaging the gums or teeth.

MARTIN STAUNT.

REFERENCES CITED

The following references are of record in the file of this patent:

UNITED STATES PATENTS

| Number | Name | Date |
|---|---|---|
| 1,450,612 | Schultz | Apr. 23, 1923 |
| 2,141,969 | Benz | Dec. 27, 1938 |

OTHER REFERENCES

Advertisement of Lactona Incorporated, page A-27, Journal of American Dental Association. Copy in Div. 55.